June 2, 1936. L. A. BUTTON 2,043,151
MANURE SPREADER
Filed Oct. 15, 1935 3 Sheets-Sheet 1
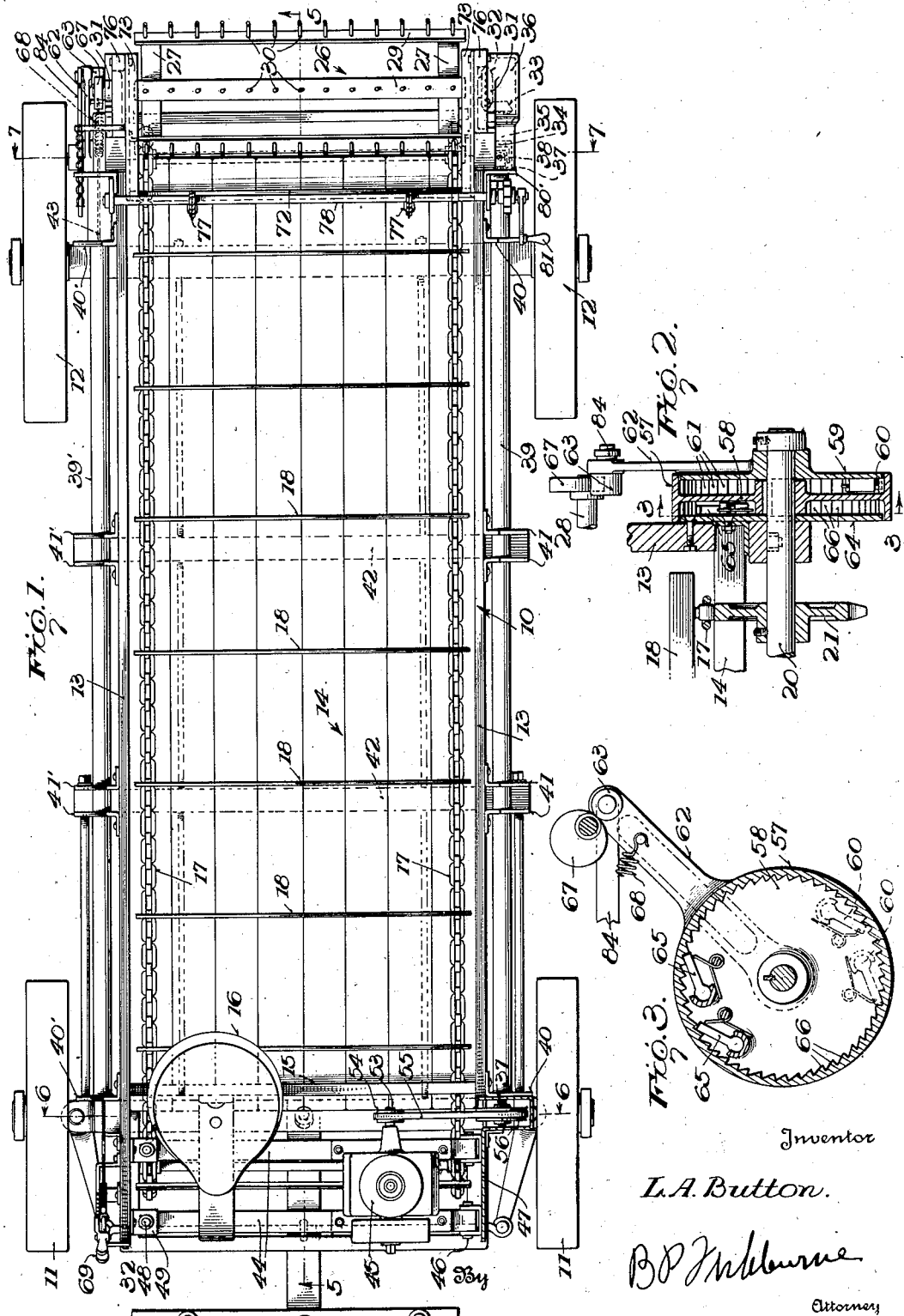
Inventor
L. A. Button.
Attorney

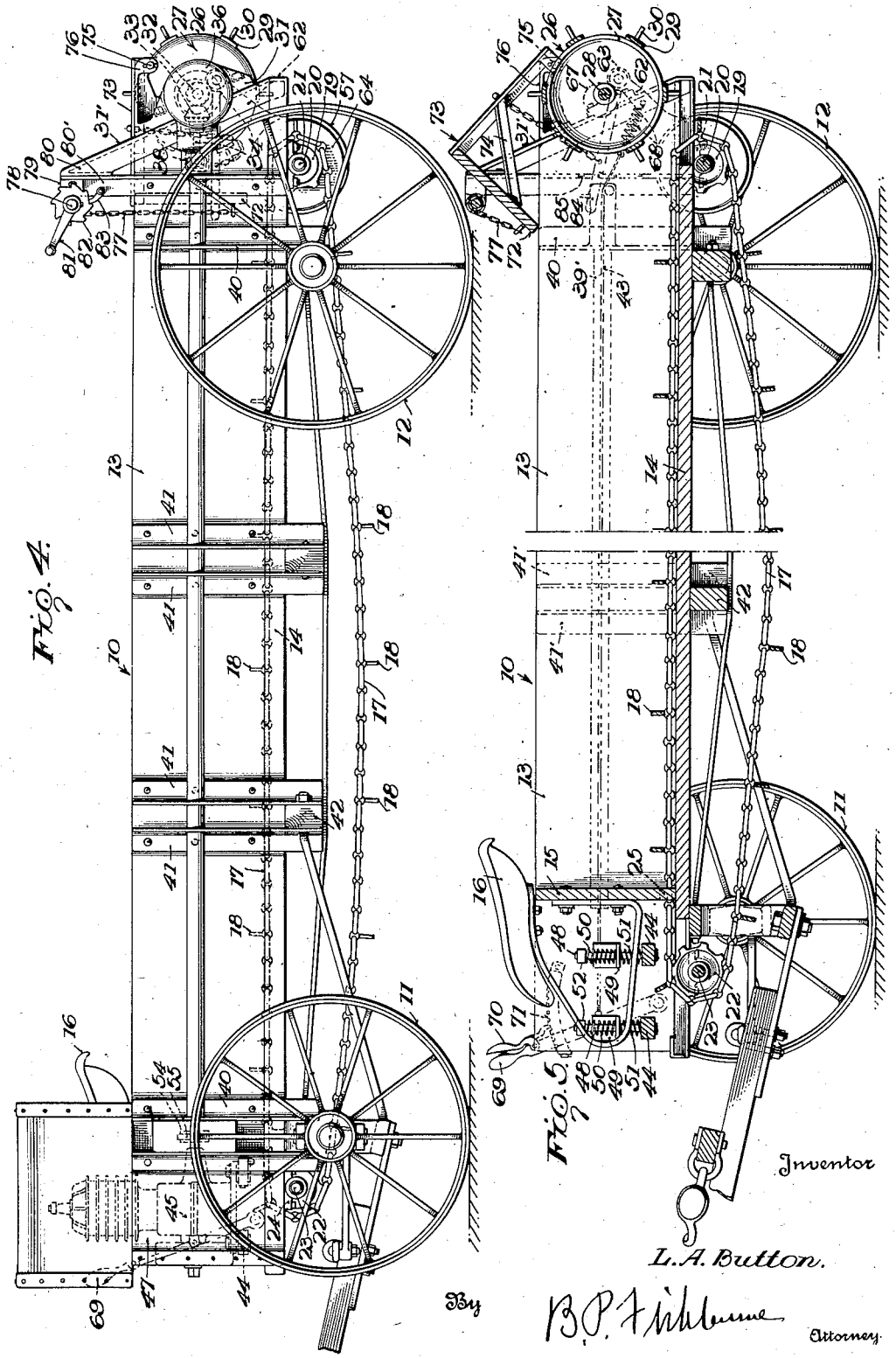

June 2, 1936.  L. A. BUTTON  2,043,151
MANURE SPREADER
Filed Oct. 15, 1935  3 Sheets—Sheet 3
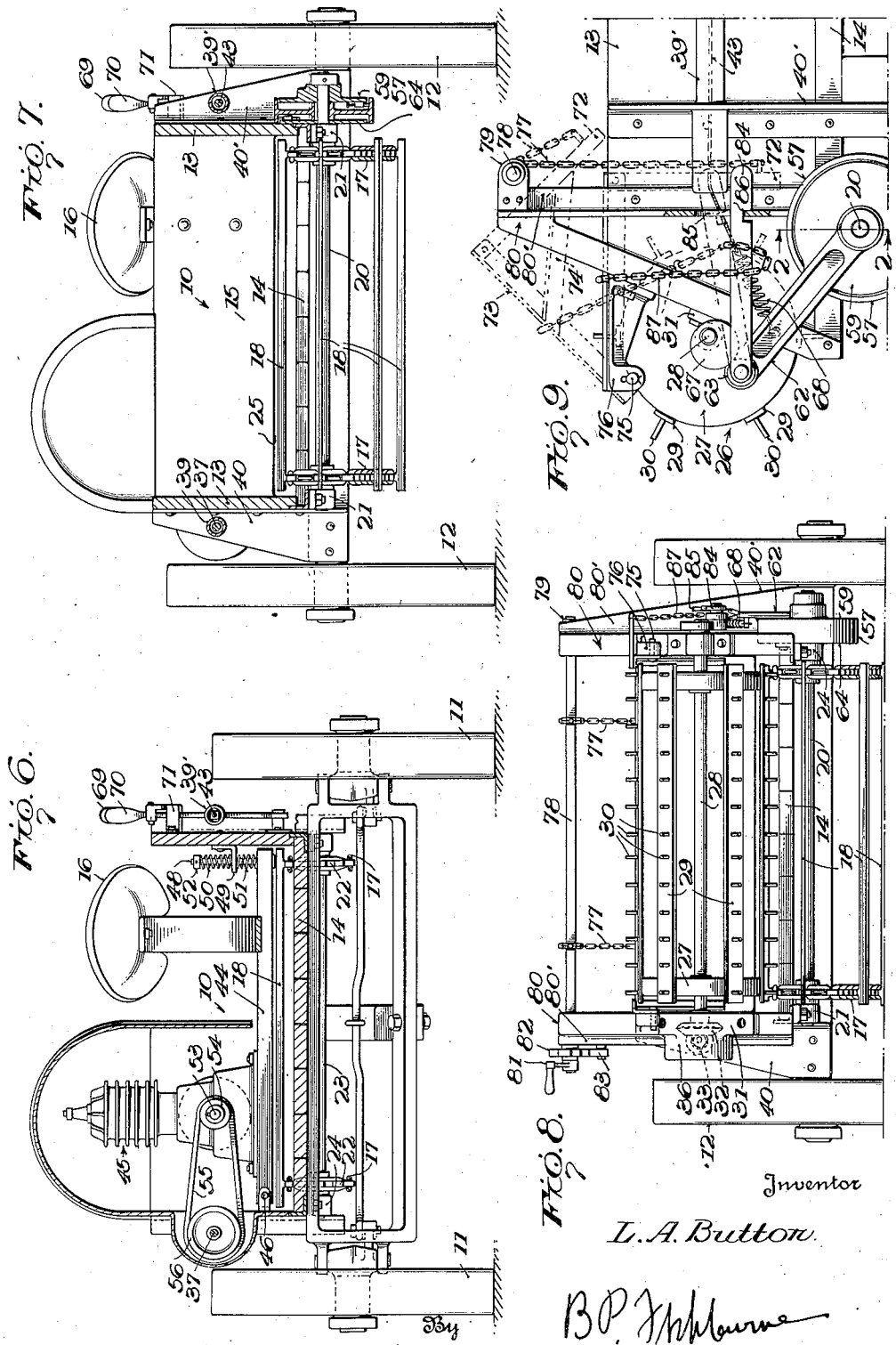

Patented June 2, 1936

2,043,151

UNITED STATES PATENT OFFICE 2,043,151

MANURE SPREADER

Leon A. Button, New Berlin, N. Y.

Application October 15, 1935, Serial No. 45,127

8 Claims. (Cl. 275—5)

My invention relates to improvements in manure spreaders.

An important object of the invention is to provide means for mounting an engine upon the spreader body in a manner to properly take up the vibrations and to drive the rotary beater from the engine.

A further object of the invention is to provide a simple and compact mechanism driven by the rotary beater and effecting an intermittent movement of the conveyor which advances the manure rearwardly of the body.

A further object of the invention is to provide pawl and ratchet mechanism to advance the conveyor, which mechanism is of simplified construction and has its operating parts enclosed.

A further object of the invention is to provide a tail gate for operation in connection with the rotary beater, and which when raised to permit of the discharge of the manure beneath the beater, will prevent the manure being thrown back upon the operator.

A further object of the invention is to provide means whereby the manure conveyor cannot be advanced until the tail gate is elevated sufficiently so that the manure may be properly fed to the beater.

Other objects and advantages of the invention will be apparent during the course of the following description.

In the accompanying drawings forming a part of this application and in which like numerals are employed to designate like parts throughout the same, Figure 1 is a plan view of a manure spreader embodying my invention, Figure 2 is a transverse section through the pawl and ratchet mechanism taken on line 2—2 of Figure 9, Figure 3 is a vertical section through the pawl and ratchet mechanism taken on line 3—3 of Figure 2, Figure 4 is a side elevation of the manure spreader.

Figure 5 is a central vertical longitudinal section taken on line 5—5 of Figure 1, Figure 6 is a transverse section taken on line 6—6 of Figure 1, Figure 7 is a transverse section taken on line 7—7 of Figure 1, Figure 8 is an end elevation of the spreader, and, Figure 9 is a side elevation of the spreader, viewed from the opposite side as shown in Figure 4.

In the drawings, wherein for the purpose of illustration is shown a preferred embodiment of my invention, the numeral 10 designates a box or body, which may be mounted upon the running gear of a wagon, including front wheels 11 and rear wheels 12. The box or body includes sides 13, a bottom 14, and front-end 15. The rear end of the box or body is formed open, for a purpose to be described. The numeral 16 designates the operator's seat, which is preferably arranged near one side 13. The front-end 15 is spaced rearwardly from the forward ends of the side 13 and bottom 14, thereby providing a space for the mounting of an internal combustion engine, to be described.

The manure is loaded into the box or body 10 and is fed or worked rearwardly by a conveyor, including spaced longitudinal chains 17 connected by spaced bars 18. The manure rests upon the bottom 14 and is fed or dragged rearwardly by the transverse bars 18. At their rear ends the chains 17 engage sprocket wheels 19, mounted upon a transverse shaft 20, journaled in bearings 21, attached to the bottom 14. The chains and bars travel over the rear end of the bottom, as clearly shown in Figure 5. At their forward ends, the chains 17 engage sprocket wheels 22, rigidly secured to a transverse shaft 23, journalled in bearings 24, attached to the sides 13. The chains 17 and bars 18 travel over the forward end of the bottom 14 and also pass through an opening 25, Figure 7, formed in the front-end 15.

A rotatable beater or drum 26 is arranged at the rear end of the box or body 10 and this beater is shown as comprising wheels or drums 27, rigidly mounted upon beater shaft 28. The drums 27 are rigidly connected by spaced bars 29, constituting the periphery of the beater and these bars carry teeth or prongs 30, as shown. The beater shaft 28 is journalled in bearings 31, rigidly attached to rear bars 31', and these bars are preferably vertically inclined and spaced rearwardly of the bottom 14, as shown.

At one end, the beater shaft 28 carries a bevelled gear 32, rigidly attached thereto, and this bevelled gear permanently engages a bevelled gear 33, carried by a stub shaft 34, journalled in a bearing 35. The bevelled gears 32 and 33 are housed within a casing 36, which is adapted to hold grease or the like. The stub shaft 34 is connected with a longitudinal drive shaft 37 by means of a universal joint 38, and this drive shaft extends through a stationary tube or pipe 39, and is journalled therein by means of suitable bearings. The tube or pipe 39 is passed through openings formed in stays or uprights 40 and 41, the stays 41 being arranged in pairs. These stays are bolted or rigidly attached to the sides 13 and the pairs of stays 41 are also bolted or rigidly attached to transverse beams 42, rigidly attached to the bottom 14. Vertical stays or uprights 40' and 41' are arranged in a corresponding manner upon the outer surface of the opposite side 13 and are bolted or rigidly attached thereto and the stays or uprights 41' are also bolted to the beams 42. These stays or uprights are in the form of angle irons and are rigid and form a strong brace between the sides and bottom of the box or body so that the sides are retained at a right angle to the bottom. The stays or uprights 40' and 41' have openings formed therein for receiving and holding a tube or pipe 39' corresponding to the tube or pipe 39. The tube 39' receives a cable 43, for a purpose to be described.

Disposed in the forward end of the box or body 10 is a swinging support or platform, including a pair of bars 44. These bars may be rigidly connected by any suitable means and are shown as bolted to the base or crank case of an internal combustion engine 45, so that these elements may swing or vibrate as a unit. At corresponding ends, the bars 44 are pivoted to swing vertically by means of hinges 46 secured to a portion of a stationary housing 47, which housing is rigidly attached to the side 13 and bottom 14. The bars 44 are therefore pivotally supported at their ends adjacent to the internal combustion engine 45, to swing vertically, and the opposite or free ends of these bars 44, Figure 5, are rigidly attached to upstanding rods 48, slidably mounted within openings formed within stationary brackets 49, which brackets are rigidly attached to the adjacent side 13. Compressible coil springs 50 and 51 are carried by the rods 48 and arranged above and below the brackets 49, the rods 48 carrying nuts 52. The function of these springs is to oppose the reciprocatory movement of the rods 48 in either direction, thus providing yielding means for absorbing the vibrations caused by the operation of the internal combustion engine.

The engine 45 has a crank shaft 53, having pulley 54 rigidly secured thereon and this pulley is engaged by a belt 55 engaging a pulley 56, rigidly mounted upon the drive shaft 37.

As more clearly shown in Figures 2 and 3, the transverse shaft 20 has pawl and ratchet mechanism associated therewith to turn the same. This pawl and ratchet mechanism includes a drum 57, having a head 58, rigidly mounted upon the shaft 20. The numeral 59 designates a disk which is rotatably mounted upon the shaft 20 and covers the outer side of the drum 57, and this disk carries spring pressed pivoted pawls 60, to engage ratchet teeth 61, formed upon the inner surface of the drum 57 upon the outer side of the head 58. Preferably formed integral with the disk 59 is a lever 62 and this lever carries a roller 63, for a purpose to be described. A second disk 64 covers the inner end of the drum 57 and this disk 64 is stationary and is rigidly attached to the side 13 and associated stationary elements, so that the disk 64 is held against rotation. The disk 64 carries spring pressed pawls 65, to engage ratchet teeth 66, formed upon the inner surface of the drum 57 upon the inner side of the head 58. The pawls 65 coact with the ratchet teeth 66, to prevent backward turning movement of the drum 57.

Means are provided to oscillate the disk 59 and arm 62, including a cam or eccentric 67, rigidly mounted upon the beater shaft 28, and arranged to engage with the roller 63. A retractile coil spring 68 is secured to the lever 62 and is attached to the cable 43, and this cable is connected with a lever 69, pivoted near the front of the box or body, and having a latch 70, to coact with a toothed quadrant 71. When the lever 69 is swung forwardly and latched in this position, the spring 68 is placed under tension, and the lever 62 is swung to retain the roller 63 in contact with eccentric 67, the spring serving to return the lever to the forward position as the roller engages the reduced portion of the eccentric.

The numeral 72 designates a tail gate, rigidly attached at its upper end to arms 73 and having diagonal braces 74. The tail gate, when in the lowered position, is vertically arranged, in advance of the rotatable beater and the arms 73 are pivotally supported by pivot elements 75, carried by stationary brackets 76. The pivots 75 are at the rear of the beater shaft. When the tail gate 72 is raised, to permit of the proper feeding of the manure to the rotatable beater, this tail gate is above the beater and in advance of the same, and prevents the beater from throwing the manure forwardly over the operator.

Means are provided to raise and lower the end gate comprising flexible elements or chains 77, attached to the end gate near its lower edge, and these chains are attached to the shaft 78, journalled in bearings 79, carried by brackets 80. The shaft may be turned by a hand crank 81 and is held against turning movement in an opposite direction by a ratchet wheel 82 and pawl 83, as shown.

Means are provided to prevent the operation of the manure feeding endless belt, before the tail gate has been elevated sufficiently to permit of the proper discharge of the manure. This means includes a bar 84, which is pivoted to the outer end of the lever 62, and this bar operates through a slot 85 in the upright or angle iron 80' of the bracket 80. The bar 84 has a notch 86 in its lower edge, and this notch is adapted to receive the bottom wall of the slot 85. The notch 86 is so positioned upon the lever 84 that when the eccentric 67 shifts lever 62 to the rearmost position, the notch 86 will then be located to interlock with the bottom wall of the slot 85. When this occurs, and the eccentric continues to turn, the lever 62 will remain in the rear position and will not follow the eccentric, and hence the lever will not be oscillated. The locking action occurs when the tail gate is in the lowermost position, as will be described. A chain 87 is attached to the bar 84 and to the arm 73, and when the tail gate is elevated, the chain 87 raises bar 84, unlocking the notch 86 from the wall of the slot and the bar 84 can then shift forwardly, and lever 62 is free to follow the cam in both forward and rearward movement, and hence the chains 17 are driven by the pawl and ratchet mechanism, when the tail gate 72 is raised.

The operation of the apparatus is as follows:

When the engine is operating, the shaft 28 is driven, and the beater 26 continuously rotated. The eccentric 67 is then continuously rotated. If the tail gate 72 is now in the closed or lowered position, the lever 62 cannot be operated for advancing the endless chains 17. If the lever 62 is not already locked in the rear position, the eccentric 67 will engage roller 63 and shift the lever 62 to the rearmost position and pivoted bar 84 will drop to the lowermost position as soon as the notch 86 engages over the bottom wall of the slot 85. Bar 84 and lever 62 are now locked in the rearmost position, and lever 62 cannot follow eccentric 67 in a forward direction, and hence the cam cannot oscillate the lever 62. When the tail gate 72 is shifted to the raised position, Figure 5, the chain 87 raises bar 84 and this bar is unlocked from the bottom wall of the slot 85 and is now free to shift forwardly. Spring 68 now being under tension, lever 70 being in the forward position, the lever 62 will follow the eccentric 67 in its forward and rearward movements and the lever will be oscillated thereby. This oscillatory movement of the lever effects a corresponding turning movement of the disk 59 and the pawls 60 engage the ratchet teeth 61 and effect an intermittent step-by-step turning movement of the drum 57 which turns the shaft 20 or advances the chains 17. The pawls 65 and associated elements hold the drum 57 against back turning movement.

The manure is accordingly intermittently fed slowly, toward and beneath the rotatable beater 26, and is spread or broadcasted thereby. The arrangement of the elevated tail gate 72 prevents the rotating beater from throwing the manure back upon the operator.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, what I claim is:

1. In a manure spreader, a wheeled box, a rotatable drum mounted upon the box, means to drive the drum, a tail gate for controlling the passage of manure to the drum and adapted to be shifted to an open position, conveyor means to feed the manure toward the drum, and means driven by the rotatable drum for driving the conveyor means, the driven means being connected with the tail gate so that it becomes inoperative with respect to driving the conveyor means when the tail gate is in the closed position and becomes operative for this purpose when the tail gate is shifted to the open position.

2. In a manure spreader, a wheeled box, a rotatable drum mounted upon the box, means to drive the drum, a tail gate for controlling the passage of manure to the drum and adapted to be shifted to an open position, conveyor means to feed the manure toward the drum, pawl and ratchet mechanism for driving the conveyor means and including a swinging lever, an eccentric driven by the drum and adapted to move the swinging lever, a spring connected with the lever to move it toward the eccentric, a latch device connected with the lever to hold it in the shifted position when moved thereto by the eccentric, and connecting means between the latch device and tail gate.

3. In a manure spreader, a wheeled box, a rotatable drum mounted upon the box, means to drive the drum, a tail gate for controlling the passage of manure to the drum and adapted to be shifted to an open position, conveyor means to feed the manure toward the drum, pawl and ratchet mechanism for driving the conveyor means and including a swinging lever, an eccentric driven by the drum and adapted to move the swinging lever, a spring connected with the lever to move it toward the eccentric, a bar pivotally connected with the lever and having a notch, a stationary guide for the bar having a part to enter the notch when the notch is moved toward said part, and means connecting the bar and tail gate.

4. In a manure spreader, a wheeled box, a rotatable drum mounted upon the box, means to drive the drum, conveyor means to feed the manure toward the drum, an eccentric driven by the drum, a head connected with the conveyor means, a drum carried by the head and provided upon opposite sides of the head with ratchet teeth, a pivoted disk covering the outer end of the drum, a spring pressed pawl arranged within the drum and connected with the pivoted disk and engaging one set of ratchet teeth, a stationary disk covering the inner end of the drum, a pawl pivoted to the stationary disk and engaging the other set of ratchet teeth, and a lever carried by the pivoted disk and arranged to be moved by the eccentric.

5. In a manure spreader, a wheeled box, a transverse drum shaft carried thereby, a drum mounted upon the shaft, an eccentric mounted upon the drum shaft, conveyor mechanism to feed the manure toward the drum including a transverse drive shaft arranged near the drum shaft, a head mounted upon the transverse drive shaft to turn it and having a drum provided with an internal set of ratchet teeth, a disk pivoted upon the drive shaft and covering the outer end of the drum, a pawl carried by the disk to engage the set of ratchet teeth, and a lever secured to the disk and arranged to be actuated by the eccentric.

6. In a manure spreader, a wheeled box, a rotatable beater arranged near the rear end of the box, a tube extending longitudinally of one side of the box and attached thereto, a drive shaft arranged within the tube, gearing connecting the drive shaft and beater, a conveyor mechanism operating within the box, pawl and ratchet mechanism to drive the conveyor mechanism, including a swinging lever, an eccentric driven by the beater and arranged to swing the lever, a flexible element extending longitudinally of the opposite side of the box, a spring connecting the element and lever, a tube extending longitudinally of said opposite side and attached thereto and receiving the element, means arranged near the forward end of the box and connected with the element to move it, an engine mounted upon the forward end of the box, and gearing between the engine and the forward end of the drive shaft.

7. In a manure spreader, a wheeled box including sides and a front end, said front end dividing the box into a separate forward compartment and a rear manure receiving compartment, a rotatable drum mounted upon the rear end of the box, a generally horizontal support extending transversely of the box and mounted within the forward compartment, means to pivotally connect one end of the support with the box adjacent to one of said sides of the box so that the support may swing vertically, yielding means engaging the pivoted support to absorb shocks therefrom, an internal combustion engine mounted upon the pivoted support adjacent to the pivoted end of the pivoted support and having its crank shaft extending longitudinally of the swinging axis of the pivoted support, a drive shaft mounted upon the box adjacent to that side of the box next to the pivotal connecting means of the support, flexible driving connecting means between the crank shaft of the engine and the drive shaft so that the flexible driving connecting means will not be rendered inoperative by the vibrations of the pivoted support, and driving connecting means between the rear end of the drive shaft and the rotatable drum.

8. A manure spreader comprising a wheeled box having sides and a front end, the front end dividing the box into a separate forward compartment and a rear manure receiving compartment, a rotatable drum disposed at the rear end of the box, a drive shaft mounted upon one side of the box and extending longitudinally thereof, driving connecting means between the rear end of the drive shaft and the drum, a generally horizontal support extending transversely of the box and arranged within the forward compartment and extending throughout substantially the entire length of the forward compartment, means arranged adjacent to the longitudinal drive shaft and serving to pivotally support one end of the support, yielding means engaging the opposite end of the pivoted support to absorb shocks therefrom, an internal combustion engine mounted upon the pivotal support adjacent to the pivoted end thereof with the pivoted support projecting beyond the engine for a substantial distance, the engine having its drive shaft extending parallel with the first named drive shaft, a pulley mounted upon the drive shaft of the engine, a pulley mounted upon the longitudinally extending drive shaft, a belt connecting the pulleys, and an operator's seat disposed adjacent to the forward compartment and upon one side of the engine, the arrangement being such that the forward compartment is capable of accommodating both the engine and the legs of the operator.

LEON A. BUTTON.